(12) United States Patent
Karlein

(10) Patent No.: US 8,578,588 B2
(45) Date of Patent: Nov. 12, 2013

(54) SYSTEM PENDULUM APPARATUS AND METHOD

(76) Inventor: Eugen Karlein, Mellrichstadt (DE)

( * ) Notice: Subject to any disclaimer, the term of this patent is extended or adjusted under 35 U.S.C. 154(b) by 969 days.

(21) Appl. No.: 12/522,343

(22) PCT Filed: Aug. 30, 2007

(86) PCT No.: PCT/DE2007/001550
§ 371 (c)(1),
(2), (4) Date: Jul. 7, 2009

(87) PCT Pub. No.: WO2008/031392
PCT Pub. Date: Mar. 20, 2008

(65) Prior Publication Data
US 2010/0038866 A1    Feb. 18, 2010

(30) Foreign Application Priority Data
Sep. 13, 2006  (DE) .................. 10 2006 043 730

(51) Int. Cl.
*B23B 31/103*    (2006.01)

(52) U.S. Cl.
USPC ........... 29/559; 279/2.01; 279/2.24; 279/106; 279/127

(58) Field of Classification Search
USPC ......... 29/559; 279/2.01, 2.21, 2.24, 106, 109, 279/127, 152
IPC .................................. B23B 31/103
See application file for complete search history.

(56) References Cited

U.S. PATENT DOCUMENTS

| 2,514,472 | A | * | 7/1950 | Cassidy | 279/123 |
| 2,815,959 | A | * | 12/1957 | Vandenberg | 279/123 |
| 3,420,538 | A | * | 1/1969 | Benjamin et al. | 279/4.01 |
| 3,864,805 | A | * | 2/1975 | Klukos | 29/718 |
| 4,215,605 | A | * | 8/1980 | Toth et al. | 82/165 |
| 4,316,614 | A | * | 2/1982 | Clopton | 279/136 |
| 4,431,202 | A | * | 2/1984 | Swenson | 279/106 |

(Continued)

FOREIGN PATENT DOCUMENTS

| DE | 199 34 375 A1 | 2/2001 |
| DE | 19934375 A1 * | 2/2001 |
| JP | 11 048012 | 2/1999 |
| JP | 11048012 A * | 2/1999 |

OTHER PUBLICATIONS

Bodo Bahr, Clamping Chuck, Feb. 1, 2001, DE 19934375 A1, English Translation, USPTO, Translation: McElroy Translation Co.; pp. 1-14.*

*Primary Examiner* — Eric A Gates
*Assistant Examiner* — Bayan Salone
(74) *Attorney, Agent, or Firm* — McGlew and Tuttle, P.C.

(57) ABSTRACT

A system pendulum apparatus (13) is provided for a chuck and a method is provided for the clamping of workpieces with a pendulum element (16) and a basal element (30). An axially swivelable connection is provided between the pendulum element and the basal element by way of an element connection device. A swivel range a of the pendulum element can be restricted by a restriction device (39), and the pendulum element can be returned by a return device to a central position of the swivel range. The pendulum element can be fixed within the swivel range by a fixing device (23). The basal element can be joined by a joining device to one jaw of a chuck (10). The pendulum element has a clamping device with two exchangeable clamping elements (20), which are displaceable and fixable.

18 Claims, 4 Drawing Sheets

(56) References Cited

U.S. PATENT DOCUMENTS

| | | | |
|---|---|---|---|
| 4,631,987 A * | 12/1986 | Buck .............................. 81/57.14 |
| 4,828,276 A * | 5/1989 | Link et al. ........................ 279/33 |
| 5,137,287 A * | 8/1992 | Hsu .............................. 279/2.23 |
| 5,184,833 A * | 2/1993 | Cross et al. ................... 279/106 |
| 5,322,305 A * | 6/1994 | Cross et al. ................... 279/124 |
| 5,409,242 A * | 4/1995 | Gonnocci ..................... 279/106 |
| 6,264,210 B1 * | 7/2001 | Difasi et al. .................. 279/124 |
| 6,367,816 B1 * | 4/2002 | Denzinger et al. ............ 279/141 |
| 6,394,467 B1 * | 5/2002 | Oki et al. ...................... 279/106 |
| 6,568,694 B1 * | 5/2003 | White ........................... 279/133 |
| 6,655,699 B2 * | 12/2003 | Grobbel ........................ 279/132 |
| 6,910,693 B2 * | 6/2005 | Onyszkiewicz et al. ...... 279/106 |

\* cited by examiner

SYSTEM PENDULUM APPARATUS AND METHOD

CROSS REFERENCE TO RELATED APPLICATIONS

This application is a United States National Phase application of International Application PCT/DE2007/001550 and claims the benefit of priority under 35 U.S.C. §119 of German Patent Application DE 10 2006 043 730.6 filed Sep. 13, 2006, the entire contents of which are incorporated herein by reference.

FIELD OF THE INVENTION

The present invention pertains to a system pendulum apparatus for a chuck and a method for clamping of workpieces with a pendulum element and a basal element, wherein there is an axially swivelable connection between the pendulum element and the basal element by way of an element connection device, a swivel range a of the pendulum element can be restricted by means of a restriction device, and the pendulum element can be returned by means of a return device to a central position of the swivel range. Moreover, the present invention relates to a chuck comprising system pendulum apparatuses.

BACKGROUND OF THE INVENTION

System pendulum apparatuses and clamping methods as cited in the introduction are sufficiently known and are employed for low-warpage clamping of thin-walled rings, such as roll blanks for the manufacture of ball bearings, or for clamping of non-circular workpieces. Known types of chucks are generally composed of three pendulum apparatuses each having two clamping elements. System pendulum apparatuses are preferably likewise employed on hydraulically actuated chucks, whereby said chucks have a small clamping stroke. If non-circular workpieces are clamped, the system pendulum apparatuses are adjusted in such a way that the clamping jaws, which are each arranged in pairs on the upper surface, abut against the workpiece with nearly identical pressure, whereby deviations in the shape of the workpiece can be reduced. However, due to the design of the pendulum jaws, the diameter range of the workpieces to be machined is restricted such that for the clamping range of the chuck several pendulum jaws of different sizes are required resulting in that efficient machining can be achieved only in mass production.

In this context, there are known from the state of the art pendulum chucks with system pendulum apparatuses, in which the system pendulum apparatus is connected to the pendulum chuck by means of a rotational axis, wherein the pendulum stroke is restricted by a pin tangent to the rotational axis and by conical recesses provided in the rotational axis. The system pendulum apparatus is additionally furnished with clamping inlets being tightly fitted to the system pendulum apparatus, allowing for a workpiece to be clamped therebetween. An adjustment of the system pendulum apparatus to various workpiece diameters is performed by radial adjustment of the system pendulum apparatus in relation to a rotational axis of the workpiece by means of the pendulum chuck. By way of this action, the clamping range of the pendulum chuck is restricted to a small diameter range. Besides, a return of the system pendulum apparatus to a central position is performed by means of two resilient arresting pins.

SUMMARY OF THE INVENTION

The object of the present invention is to propose a system pendulum apparatus for a chuck and a method for clamping of workpieces, by means of which workpieces can be clamped within a large diameter range at both internal and external diameters, subsequent machining of workpieces by using the same chuck is enabled, the system pendulum apparatus can be universally employed with conventional chucks and overall cost-efficient machining of workpieces is rendered feasible.

The inventive system pendulum apparatus for a chuck or the like has a pendulum element and a basal element, wherein there is an axially swivelable connection between the pendulum element and the basal element by way of an element connection device, a swivel range of the pendulum element can be restricted by means of a restriction device, and the pendulum element can be returned by means of a return device to a central position of the swivel range the pendulum element can be fixed within the swivel range a by means of a fixing device, the basal element can be joined by means of a joining device to one jaw of a chuck, and the pendulum element has a clamping device with two exchangeable clamping elements, which are displaceable and fixable.

It proves to be especially advantageous if the basal element can be joined by means of a joining device to one basal jaw of a conventional chuck. Thus, the system pendulum apparatus can be universally employed on chucks, without any need for exchanging the basal jaws of the chuck. A relatively large diameter range for clamping of workpieces can be realized by the radial adjustment of the system pendulum apparatus at the basal jaw of the chuck on the one hand and by the displaceable and fixable clamping elements of the clamping device of the pendulum element on the other hand.

According to one advantageous embodiment, the element connection device has a pivot bearing. Said pivot bearing enables swiveling of the pendulum element relative to the basal element in such a manner that the pendulum element is oriented corresponding to the surface of a workpiece for uniform clamping of the same.

It proves to be particularly advantageous if the pivot bearing is formed of a bolt. By means of a bolt, the formation of a swivel axis between the pendulum element and the basal element is enabled in an easy manner.

According to another embodiment, the pivot bearing can be formed of the pendulum element and the basal element. In this way, complementary internal and external diameters, which can be inserted into one another, can be formed at the pendulum element and the basal element, thus establishing a swivelable connection between the pendulum element and the basal element.

Besides, it proves to be particularly advantageous if a coupling device is provided for positively fitting the pendulum element to the basal element. The coupling device prevents that the pendulum element becomes detached from the basal element and ensures that there is established such a connection between both elements that is capable of withstanding the forces occurring during machining of the workpiece.

According to one embodiment of the coupling device, the same is formed as a bearing ring fastened to the pendulum element. A bearing ring suitably enables force absorption and the establishment of a swiveling connection, which is largely free of play, between the pendulum element and the basal element.

Any self-actuated return of a pendulum movement of the pendulum element with respect to the basal element is enabled if the return device is formed between the bearing ring and the basal element.

It proves to be particularly advantageous if the return device is provided with a spring detent arrangement with a detent element, which engages into a detent recess running with increasing depth in the direction of the central position. In this way, the pendulum element is allowed to automatically swivel back into the central position after removal of a workpiece. Besides, the insertion and clamping of a workpiece is facilitated starting from the central position of the pendulum element.

In order to prevent that the pendulum element swivels away from a central position during clamping of a workpiece, it proves to be advantageous if the fixing device is provided with a screw connection for fastening the pendulum element to the basal element in a rotationally fixed manner.

According to one embodiment, the fixing device has an arresting device for arresting the pendulum element in the central position of the swivel range in a rotationally fixed manner. Hence, a central position of the pendulum element can be easily arrested in such a way that for instance subsequent machining, such as reclamping on an already machined diameter of the workpiece, can be performed without long machine set-up times or the need for exchanging a chuck.

If the arresting device is formed as a pin connection, the central position of the pendulum element can be fixed by means of a simple, positively-fitted pin connection. According to another embodiment, the arresting device can also be formed as a fitting screw connection. The pendulum element can thus simultaneously be arrested and fixed.

It proves to be advantageous if the clamping device of the pendulum element is provided with two guide grooves being radially oriented to the rotational axis of the chuck and being each disposed on the outer edge area of the pendulum element to guide the clamping elements. If the guide grooves are disposed in a relative arrangement of e. g. 60° in relation to one another, and if the pendulum element is mounted on the basal jaw in such a manner that the central axes of the guide grooves intersect the rotational axis of the chuck, a workpiece can be clamped within a relatively large diameter range by fixing the clamping elements at the guide grooves with an overall uniform diameter. Due to the fact that clamping elements can be fixed in such a manner, there are no movable components arranged on the system pendulum element side facing the workpiece. Disruptions caused by contamination during operation can thus essentially be precluded.

It is particularly advantageous if the guide grooves are provided with a detent toothing for meshing of the clamping elements formed as clamping jaws having correspondingly formed detent toothing. Consequently, all clamping elements of a system pendulum apparatus can generally be mounted with a uniform diameter, without the need for performing time-consuming relative adjustments of the clamping elements. The clamping jaws can likewise be rotated by way of assembly and reassembly by 180°, such that a workpiece can be clamped both at an internal and an external diameter.

According to one embodiment, the restriction device has a pin connection established to one free end of a pin, which has a range of movement that is restricted by an internal wall of a recess. The internal wall of the recess thus serves as a stop for the pin and restricts the swivel range of the pendulum element relative to the basal element within an angular distance that is suitable for the clamping of workpieces.

If the joining device for joining the basal element to a basal jaw of a chuck has a screw-sliding block connection for displacing and fixing of the basal element at the basal jaw, the system pendulum apparatus can be mounted at basal jaws of conventional chucks, without the need for exchanging the basal jaws of the chucks.

It proves to be particularly advantageous if the pendulum element is provided with at least one abutting surface that is adjustable at least in axial direction for abutting a workpiece. In this way, an adjustment of the abutting surface as a workpiece stop is feasible.

The inventive chuck for clamping of workpieces or the like comprises at least three system pendulum apparatuses, wherein the system pendulum apparatuses are each displaceable and fixable by means of a joining device at jaws of the chuck. Thus, an adjustment of the system pendulum apparatuses to a rotational axis of the chuck and to various diameters of workpieces can be performed in an easy manner, wherein a clamping of the workpiece is performed by means of the movable basal jaws of the chuck and the system pendulum apparatuses fastened thereto.

In the inventive method for clamping of workpieces, a chuck with at least three system pendulum apparatuses is used for the clamping of a workpiece.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
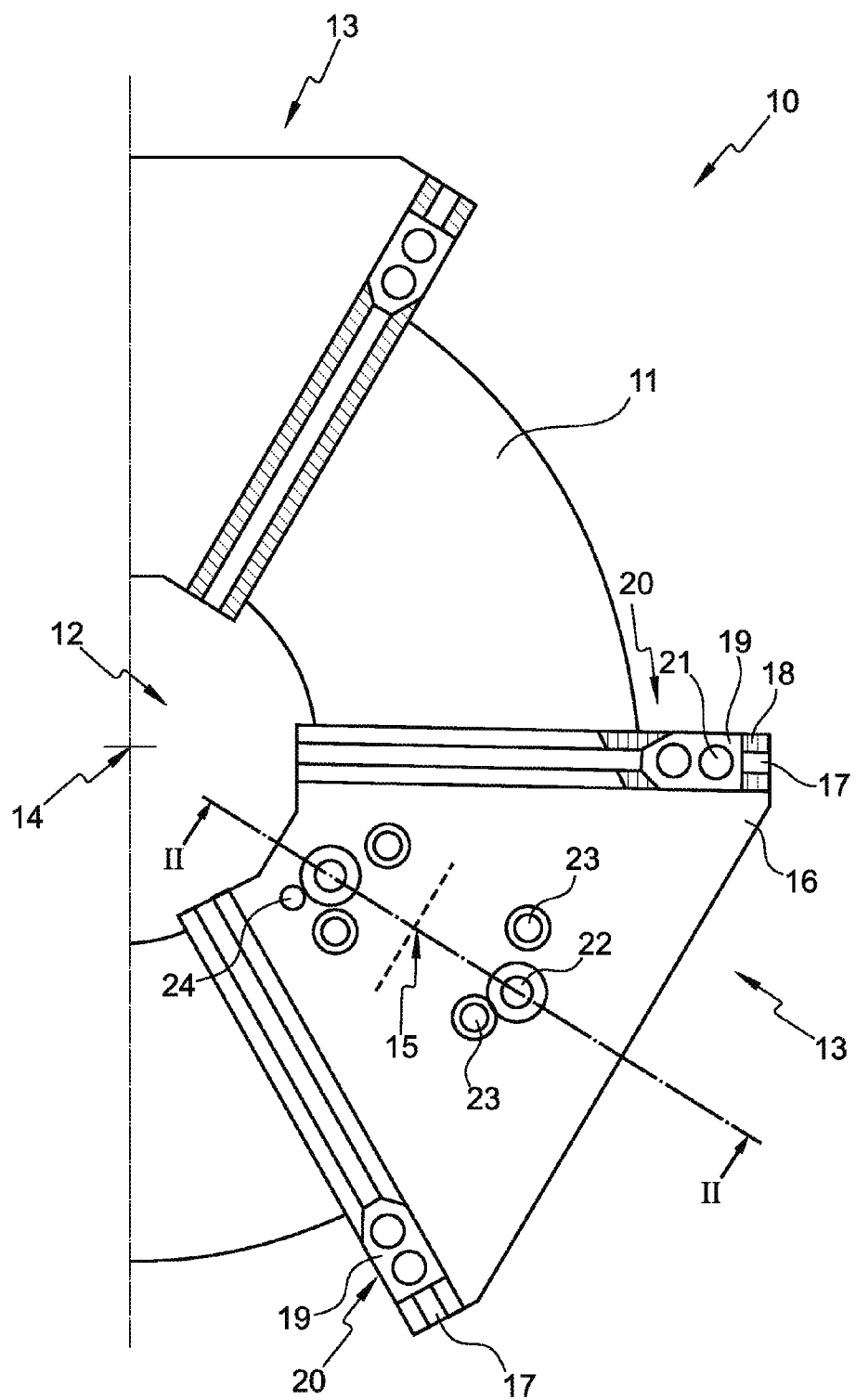
FIG. 1 is a broken plan view of a chuck with system pendulum apparatuses seen in the direction of the rotational axis.

Referring to the drawings in particular, FIG. 1 illustrates a chuck 10 with a chuck casing 11 and a through hole 12 for the passing of workpieces and system pendulum apparatuses 13, which are fastened on basal jaws 25, not shown in this view, in the chuck casing 11. The system pendulum apparatuses 13 are oriented in relation to a swivel axis 14 of the chuck 10, are linearly movable by the basal jaws 25 of the chuck 10 in a radial direction, and are themselves swivelable about a swivel axis 15. A pendulum element 16 of one of the system pendulum apparatuses 13 is provided with two guide grooves 17, which are formed at the pendulum element 16 in a radial direction in relation to the rotational axis 14. The guide grooves 17 have a partly illustrated detent toothing 18, into which a clamping element 20 formed as clamping jaw 19 having correspondingly formed detent toothing is respectively inserted. The clamping jaws 19 are fastened within the guide groove 17 by means of screws 21 and sliding blocks, not shown here. The clamping jaws 19 can be easily adjusted to a uniform diameter and can be rotated by means of assembly and reassembly by 180° such that both an internal diameter and an external diameter of a workpiece can be clamped with the chuck 10. An assembly of the system pendulum apparatus 13 on the basal jaw 25, not shown here, of the chuck 10 is performed by means of screws 22. A central position of the pendulum element 16 can be fixed by means of screws 23. The central position, illustrated in FIG. 1, of the system pendulum apparatus 13 can additionally be adjusted by using a pin 24.

Figure 2:
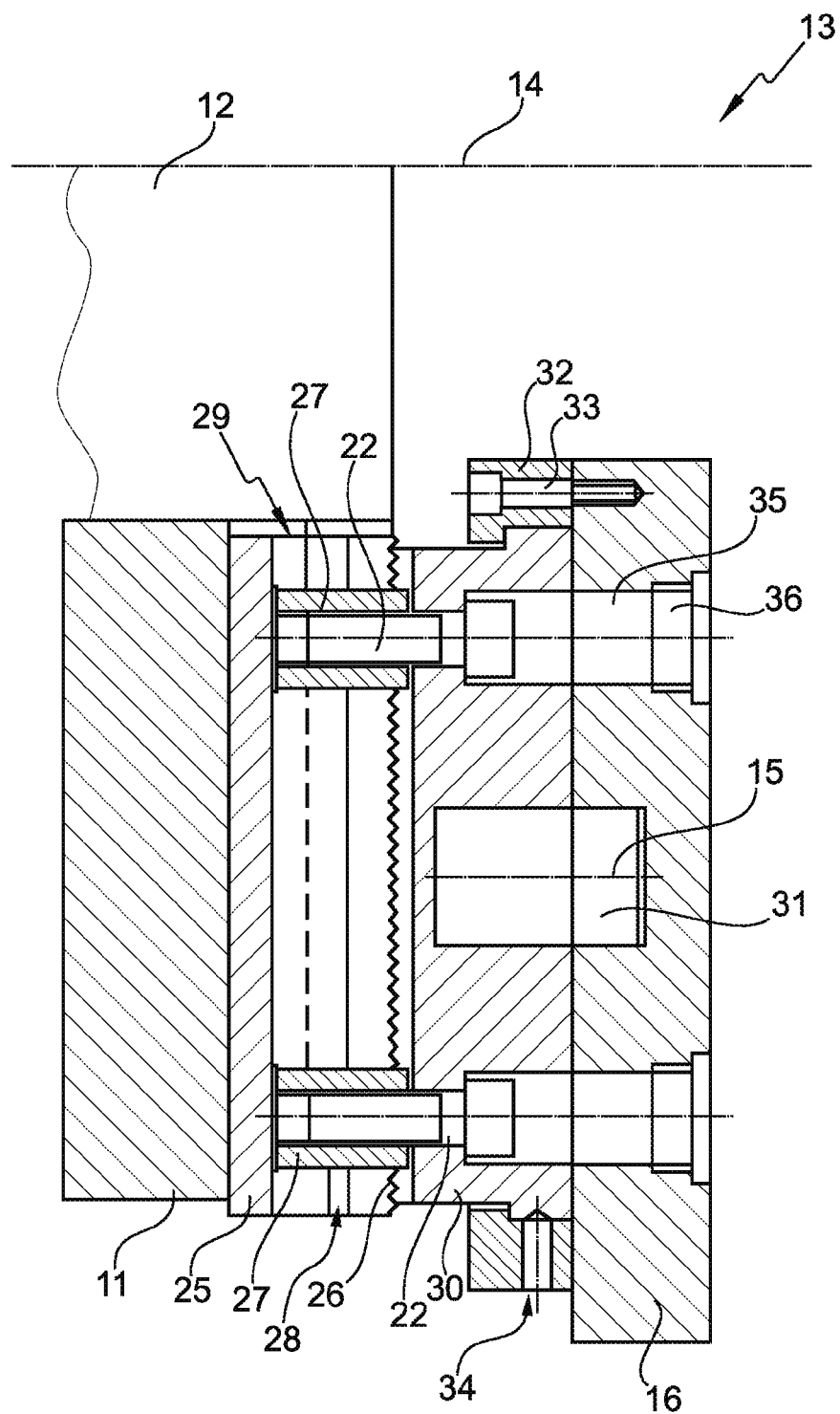
FIG. 2 is a sectional view of a system pendulum apparatus with a partial view of the chuck along line II-II of FIG. 1.

FIG. 2 illustrates a sectional view of the system pendulum apparatus 13 along line II-II of FIG. 1. This figure illustrates that the system pendulum apparatus 13 is mounted on the basal jaw 25 having a detent toothing 26 and is fastened in a groove 28 of the basal jaw 25 to the screws 22 by means of sliding blocks 27. The basal jaw 25 is, in turn, received in a groove 29 of the chuck casing 11 in a linearly movable manner. The system pendulum apparatus 13 is further composed of a basal element 30 and the pendulum element 16, wherein the pendulum element 16 is fastened to the basal element 30 by means of a bolt 31 in such a manner that it is rotatable about the swivel axis 15 and abuts against the basal element 30, secured by means of a ring 32, largely free of axial play. The ring 32 is connected to the pendulum element 16 by means of screws 33. Besides, a spring detent arrangement 34 is inserted into the ring 32. The pendulum element 16 and the basal element 30 are provided with through holes 35, into which the screws 22 can be inserted. In order to prevent contamination, the through holes 35 are sealed by means of closing caps 36.

Figure 3:
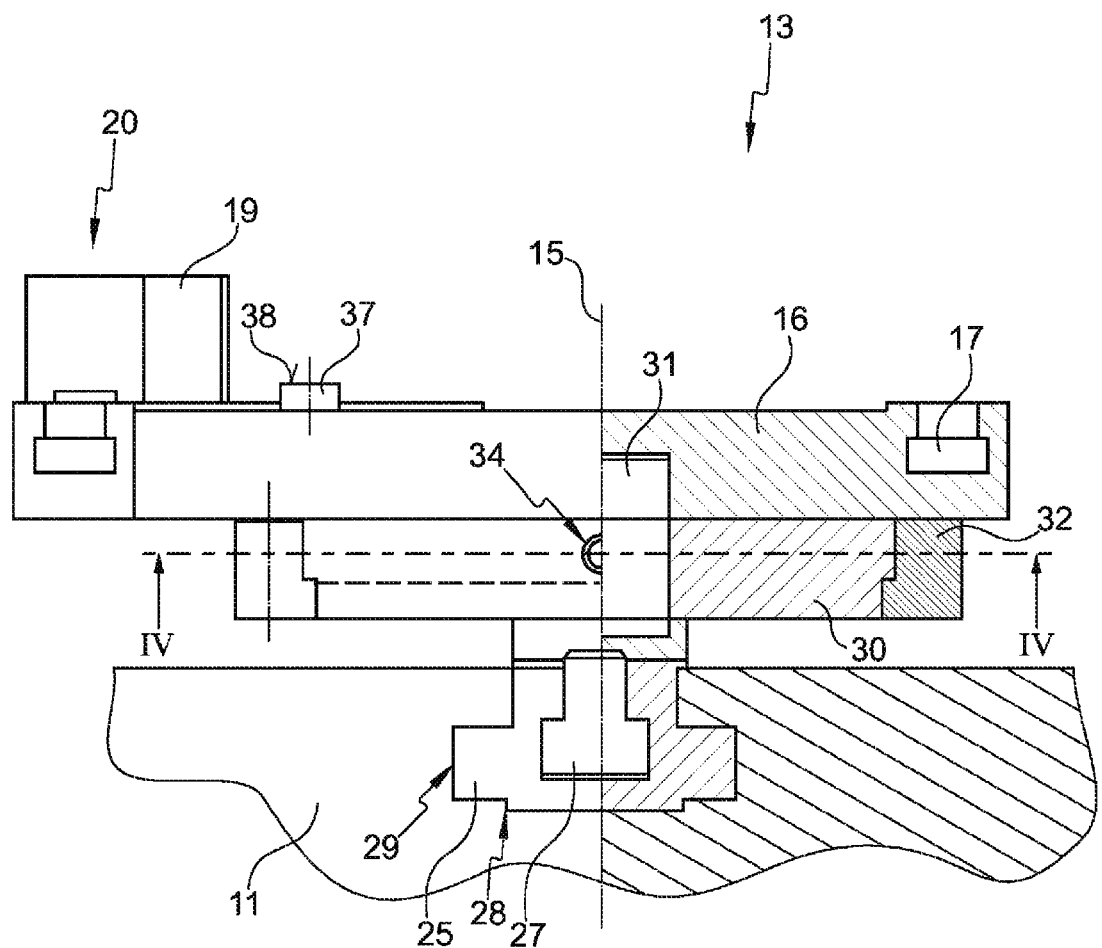
FIG. 3 is a half-sectional view of the system pendulum apparatus with a partial view of the chuck along line III-III of FIG. 4.
Figure 4:
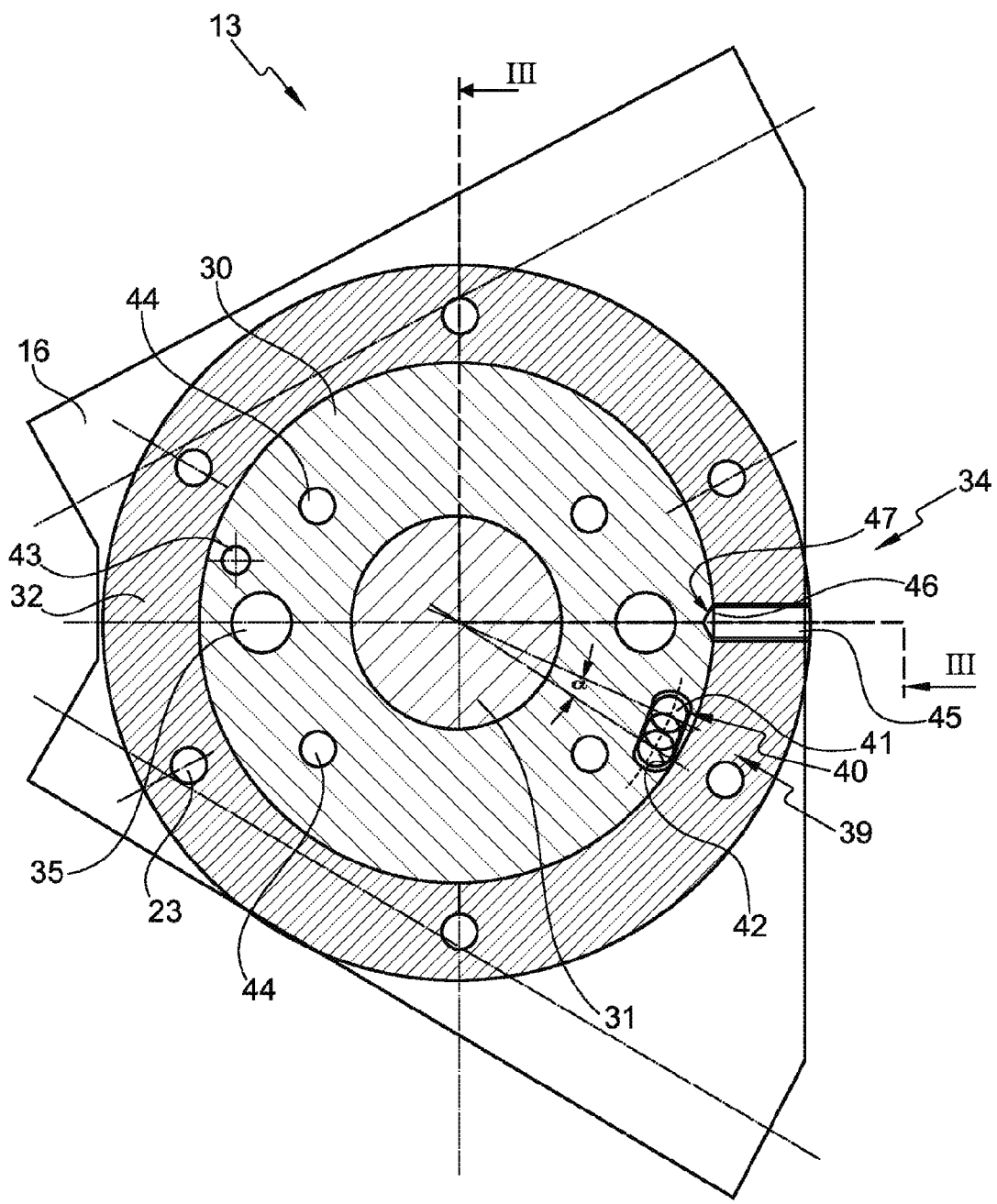
FIG. 4 is a sectional view of the system pendulum apparatus along line IV-IV of FIG. 3.

FIG. 3 shows a half-sectional view of the system pendulum apparatus 13 along line III-III of FIG. 4. A screw 37 having an abutting surface 38 is inserted into the pendulum element 16. The abutting surface 38 serves for abutting workpieces that can be clamped by means of the system pendulum apparatus 13, wherein the distance between the abutting surface 38 and the pendulum element 16 can be adjusted by using the screw 37. If three system pendulum apparatuses 13 are used, workpieces can be abutted against three abutting positions on the same plane.

FIG. 4 illustrates a sectional view along line IV-IV of FIG. 3. The ring 32 completely surrounds the basal element 30 and is connected to the pendulum element 16 by means of the screws 33. In the basal element, the bolt 31 is inserted as swivel axis 15 and a swivel range α of the pendulum element 16 to the basal element 30 is restricted by a restriction device 39. The restriction device 39 has a recess 40 disposed in the basal element 30 and a pin 41, which is fastened in the pendulum element 16 and can be moved within the recess 40. By abutting the pin 41 against an internal wall 42 of the recess 40, the swivel range a of the pendulum element 16 is restricted. Furthermore, the basal element 30 is provided with a bore 43 for the pin 24 for arresting of the central position of the pendulum element 16 and with threaded bores 44 for insertion of the screws 23. Hence, fastening of the pendulum element 16 on the basal element 30 in a central position is enabled in an easy manner. Within the ring 32, the spring detent arrangement 34 is inserted as screw 45 with a detent element 46, whereby the detent element 46 engages into a recess 47 in the basal element 30 running with increasing depth in the direction of the central position of the pendulum element 16.

While a specific embodiment of the invention has been described in detail to illustrate the application of the principles of the invention, it will be understood that the invention may be embodied otherwise without departing from such principles.

The invention claimed is:

1. A system pendulum apparatus for a chuck or the like, the apparatus comprising:
a pendulum element;
a basal element;
an element connection device for providing an axially swivelable connection between the pendulum element and the basal element, the connection device comprising a restriction device for restricting a swivel range of the pendulum element, a return device for returning the pendulum element to a central position of the swivel range, a fixing device for fixing that the pendulum element within the swivel range, wherein the basal element can be joined by means of a joining device to one jaw of a chuck, and the pendulum element has a clamping device with two exchangeable clamping elements, which are slideable and fixable, said clamping elements being mounted on said pendulum element and slidable in a linear direction with respect to said pendulum element;
said pendulum element swivels about a swivel axis with respect to said basal element;
said linear direction of said clamping elements is in a plane perpendicular to said swivel axis.

2. A system according to claim 1, wherein the element connection device has a pivot bearing.

3. A system according to claim 2, wherein the pivot bearing is formed of a bolt.

4. A system according to claim 2, wherein the pivot bearing is formed of the pendulum element and the basal element.

5. A system according to claim 1, wherein the pendulum element is positively fitted to the basal element by means of a coupling device.

6. A system according to claim 5, wherein the coupling device is formed as a bearing ring, which is fixed to the pendulum element.

7. A system according to claim 6, wherein the return device is formed between the bearing ring and the basal element.

8. A system according to claim 1, wherein the return device has a spring detent arrangement with a detent element, which engages into a detent recess running with increasing depth in the direction of the central position.

9. A system according to claim 1, wherein the fixing device has a screw connection for fastening the pendulum element to the basal element in a rotationally fixed manner.

10. A system according to claim 1, wherein the fixing device has an arresting device for arresting the pendulum element in the central position of the swivel range in a rotationally fixed manner.

11. A system according to claim 10, wherein the arresting device is formed as a pin connection.

12. A system according to claim 1, wherein the clamping device of the pendulum element has two radially oriented guide grooves, which are each disposed on the outer edge area of the pendulum element to guide the clamping elements.

13. A system according to claim 12, wherein the guide grooves have a detent toothing for meshing of the clamping elements being formed as clamping jaws having correspondingly formed detent toothing.

14. A system according to claim 1, wherein the restriction device has a pin connection established to one free end of a pin, which has a range of movement that is restricted by an internal wall of a recess.

15. A system according to claim 1, wherein the joining device for joining the basal element to one jaw of a chuck has a screw-sliding block connection for displacing and fixing of the basal element at the jaw.

16. A system according to claim 1, wherein the pendulum element has an abutting surface that is adjustable at least in axial direction for abutting a workpiece.

17. A chuck for clamping of workpieces or the like, the chuck comprising at least three system pendulum apparatuses, each pendulum apparatuses comprising:
a pendulum element;

a basal element;

an element connection device for providing an axially swivelable connection between the pendulum element and the basal element, the connection device comprising a restriction device for restricting a swivel range of the pendulum element, a return device for returning the pendulum element to a central position of the swivel range, a fixing device for fixing that the pendulum element within the swivel range, wherein the pendulum element has a clamping device with two exchangeable clamping elements, which are slideable and fixable and wherein the system pendulum apparatuses are each displaceable and fixable by means of a joining device at jaws of the chuck, said clamping elements being mounted on said pendulum element and slidable in a linear direction with respect to said pendulum element;

said pendulum element swivels about a swivel axis with respect to said basal element;

said linear direction of said clamping elements is in a plane perpendicular to said swivel axis.

18. A method for clamping of workpieces, the method comprising the steps of:

providing a pendulum element;

providing a basal element;

providing an element connection device for providing an axially swivelable connection between the pendulum element and the basal element, the connection device comprising a restriction device for restricting a swivel range of the pendulum element, a return device for returning the pendulum element to a central position of the swivel range, a fixing device for fixing that the pendulum element within the swivel range, wherein the pendulum element has a clamping device with two exchangeable clamping elements, which are slideable and fixable and wherein the system pendulum apparatuses are each displaceable and fixable by means of a joining device at jaws of a chuck and wherein for clamping of a workpiece the chuck having at least three system pendulum apparatuses is used, said clamping elements being mounted on said pendulum element and slidable in a linear direction with respect to said pendulum element;

said pendulum element swivels about a swivel axis with respect to said basal element;

said linear direction of said clamping elements is in a plane perpendicular to said swivel axis.

\* \* \* \* \*